(12) United States Patent
Sakurai et al.

(10) Patent No.: US 6,222,811 B1
(45) Date of Patent: Apr. 24, 2001

(54) DISC UNIT WITH CONFIGURATION FOR PERFORMING SIMULTANEOUS INSERTING AND EJECTING OPERATIONS FOR DISC

(75) Inventors: Toshihiro Sakurai; Kenji Abe; Takashi Nakashima, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/265,498

(22) Filed: Mar. 10, 1999

(30) Foreign Application Priority Data

Mar. 16, 1998 (JP) .................................................. 10-064998

(51) Int. Cl.$^7$ .................................................. G11B 33/02
(52) U.S. Cl. .......................................... 369/77.1; 369/75.2
(58) Field of Search .................................. 369/77.2, 75.1, 369/75.2, 178, 191, 192

(56) References Cited

U.S. PATENT DOCUMENTS

| | | | |
|---|---|---|---|
| 4,694,444 | 9/1987 | Koike | 369/65 |
| 4,694,445 | 9/1987 | Koike | 369/65 |
| 5,022,023 | 6/1991 | Toyoguchi | 369/77.1 |
| 5,146,446 | * 9/1992 | Ota et al. | 369/77.2 |
| 5,583,839 | 12/1996 | Choi | 369/75.2 |
| 5,671,198 | * 9/1997 | Tsuchiya et al. | 369/34 |
| 5,715,229 | * 2/1998 | Kim et al. | 369/178 |
| 5,867,470 | * 2/1999 | Kim et al. | 369/178 |

FOREIGN PATENT DOCUMENTS

| | | |
|---|---|---|
| 0 367 370 A2 | 5/1990 | (EP) . |
| 0 391 424 A2 | 10/1990 | (EP) . |
| 1-317271 | 12/1989 | (JP) . |
| 4-26952 | * 1/1992 | (JP) . |
| 6-111443 | 4/1994 | (JP) . |

* cited by examiner

*Primary Examiner*—Brian E. Miller
*Assistant Examiner*—Kenneth W. Fields
(74) *Attorney, Agent, or Firm*—Brinks Hofer Gilson & Lione

(57) ABSTRACT

Conventional disc units each involve the problem that a new disc must be inserted into the disc unit after a disc already present in the disc unit is ejected and that therefore it takes time for disc replacement. In the disc unit of the present invention, to solve the above-mentioned problem, a new second disc which has been inserted into the disc unit through an insertion opening is carried from an insertion area to a disc driving section by a conveying means. On the other hand, a first disc already present in the disc unit prior to insertion of the second disc is ejected from an ejection area to the exterior of the disc unit by both first and second ejection members. The time required for disc replacement can be shortened by performing the disc inserting operation by the conveying means and the disc ejecting operation by the first and second ejection members both in a simultaneous manner.

8 Claims, 7 Drawing Sheets

DISC UNIT WITH CONFIGURATION FOR PERFORMING SIMULTANEOUS INSERTING AND EJECTING OPERATIONS FOR DISC

BACKGROUND OF THE INVENTION

1. Field of the Invention

The present invention relates to a disc unit for such discs as CD and DVD. Particularly, the invention is concerned with a disc unit wherein the insertion and ejection of a disc are performed simultaneously.

2. Description of the Related Art

In a conventional slot-in type disc unit, a conveying roller as a disc conveying means is disposed near the back of an insertion opening and the insertion or ejection of a disc is performed with a feed force of the conveying roller.

For example, there are known a type in which a disc is held between such a conveying roller as mentioned above and a driven roller disposed in parallel with the conveying roller, and a type in which a disc is held between the conveying roller and a disc guide member disposed on, the ceiling surface or the like of the disc unit.

In such conventional disc units, a disc which has been inserted into the disc unit through the insertion opening is conveyed to a disc drive section disposed in an inner portion of the disc unit and is placed on a turntable installed within the disc drive section. Then, the disc conveying means is retracted from the disc and a clamper goes down to hold the disc between it and the turntable. Subsequently, a predetermined rotation is imparted to the disc by means of a spindle motor and thereafter the disc is subjected to reproducing or recording with use of a pickup.

When the disc is to be ejected, the rotation of the spindle motor is stopped and the clamper goes up to release the disc. At the same time, the disc is again held grippingly by the same disc conveying means as that mentioned above. Then, a reverse rotation is imparted to the conveying roller, whereby the disc is ejected from the disc drive section and further from the insertion opening.

However, the conventional disc unit described above involves the following problems.

As the above disc conveying means there is used a tapered conveying roller whose central portion is smaller in sectional area than both end portions of the same roller. The insertion or ejection of a disc is performed while the disc is held between both end portions of the conveying roller. However, the recording surface of the disc is apt to be flawed because the conveying roller comes into abutment against the recording surface perpendicularly to the same surface.

Besides, the conveying roller is usually formed using a synthetic rubber, but the kinetic friction coefficient of rubber is apt to vary depending on ambient temperature and humidity, so it is sometimes impossible to supply an optimum driving force to the disc. In the case where the pressing force against the disc is small, the conveying roller idles and cannot convey the disc.

Further, for the replacement of disc, it is necessary that the disc having been subjected to reproducing or recording be once ejected to the exterior and that a new disc be then inserted into the disc unit. Thus, a considerable time is required for the replacement of disc.

SUMMARY OF THE INVENTION

The present invention has been accomplished for solving the above-mentioned problems of the prior art and it is an object of the invention to provide a disc unit which uses a disc conveying means other than the conveying roller, thereby making it possible to not only prevent flaw of the disc surface but also effect a positive conveyance of a disc.

It is another object of the present invention to provide a disc unit wherein the replacement of disc can be done in a short time.

According to the present invention, in order to achieve the above-mentioned objects, there is provided a disc unit comprising conveying means disposed in an insertion area on an upper side to transfer a second disc toward an innermost portion of the disc unit while holding the disc, which disc is inserted into the disc unit from an insertion opening, and ejection means disposed in an ejection area on a lower side which underlies the insertion area to eject a first disc resting on a turntable to an ejection opening simultaneously with the second disc inserting operation of the conveying means, with a clamp mechanism being provided to clamp the second disc between it and the turntable when the second disc inserted by the conveying means has reached a position not overlapping the ejection means.

Thus, in the present invention, the insertion of the second disc as a new disc is performed in the insertion area on an upper side. Simultaneously, in the ejection area which underlies the insertion area, the ejection of the second disc as a previously loaded disc which has been subjected to reproducing or recording is performed. This simultaneous insertion and ejection of the discs permit shortening of the time required for disc replacement.

The second disc inserted by the conveying means stops between a clamper and the turntable and is clamped after the first disc is ejected by the ejection means. Thus, it is impossible that both first and second discs will be present near the disc drive section. In other words, it is possible to effect the disc replacement reliably.

In the above construction, the ejection means disposed in the ejection area comprises a first ejection member for moving the disc on the turntable toward the ejection opening by only a predetermined distance and a second ejection member for pushing out the disc having thus moved by the predetermined distance further to the ejection opening.

By thus constituting the ejection means in two stages, not only it is possible to surely transfer the disc to the ejection opening, but also it is possible to prevent the disc surface from being flawed because the ejection of the disc can be done without using a conveying roller.

It is preferable that the above first and second ejection members be driven by a common rotary cam.

Thus, since the first and second ejection members are driven using a single rotary cam, both can always be driven synchronously. Besides, since it is no longer required to use any other complicated drive mechanism, it becomes possible to reduce the number of driving components.

It is preferable that the ejection means be provided with a moving table for lifting the disc placed on the turntable.

Preferably, the moving table moves following a rising or falling motion of the clamp mechanism.

In this case, in an unclamped state, that is, with rise of the clamp mechanism, the moving table also goes up, so that the disc on the turntable is lifted and placed onto the moving table. Consequently, the ejection of the disc can be done reliably by the ejection means. In a clamped state, that is, when the moving table has moved down with descent of the clamp mechanism, it is possible to positively clamp the disc on the turntable because the moving table is positioned lower than the turntable.

BRIEF DESCRIPTION OF THE DRAWINGS

FIGS. 3A and 3B show disc ejecting means, in which FIG. 3A is a plan view showing a state of ejection and FIG. 3B is a side view thereof;

DETAILED DESCRIPTION OF A PREFERRED EMBODIMENT

The present invention will be described hereinunder with reference to the accompanying drawings.

Figure 1A:
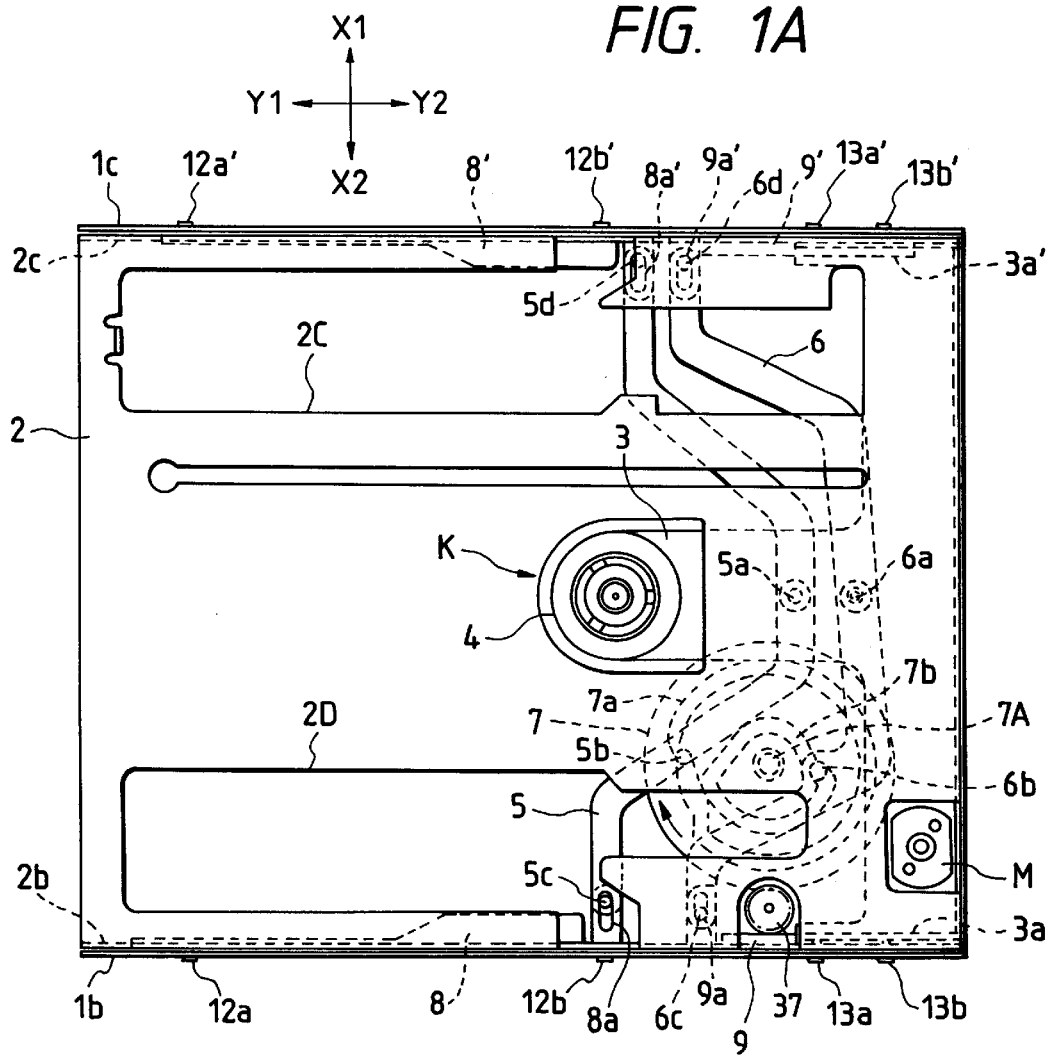
FIG. 1A is a plan view of a main housing of a disc unit embodying the present invention and FIG. 1B is a side view thereof.
Figure 1B:
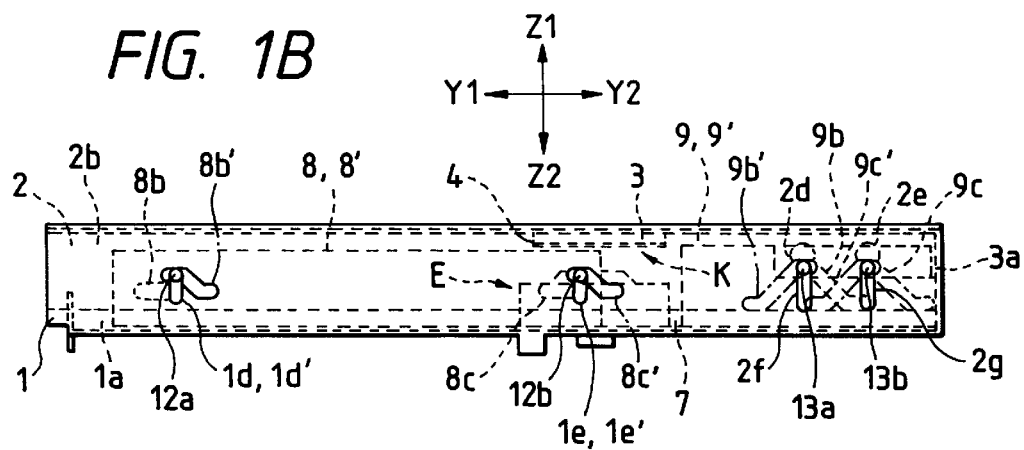

FIG. 1A is a plan view of a main housing of a disc unit embodying the present invention and FIG. 1B is a side view thereof.

In the disc unit of FIG. 1, a main housing 1, which constitutes a bottom side, is covered with a ceiling board 2 disposed on a top (Z1) side. Between the main housing 1 and the ceiling board 2 is disposed a clamp mechanism K which comprises a clamp chassis 3 and a clamper 4 supported rotatably at a front end portion of the chassis 3. In the drawings, Y1 side is a disc insertion side and Y2 side is the innermost side. On the insertion side of the disc unit there are formed two openings, i.e., insertion opening (EN) and ejection opening (EX), vertically side by side.

On a bottom 1a of the main housing 1 are disposed side by side a first connecting member 5 and a second connecting member 6 each formed in a general V shape and which are supported pivotably at pivot shafts 5a and 6a, respectively. Between the first and second connecting members 5, 6 is disposed a rotating shaft 7A, on which ismounteda disc-like rotary cam 7 rotatably. The rotary cam 7 is provided on an upper side of the first and second connecting members 5, 6. Plural cam grooves are formed on both surface and back sides of the rotary cam 7. In FIGS. 1A and 1B, cam grooves 7a and 7b, which are on the back (Z2) side, are indicated by dotted lines. Gear grooves are formed circumferentially in the edge portion of the rotary cam 7 and are in mesh with a transfer gear 37 and a small gear 47 which will be described later. A convex portion 5b formed on the first connecting member 5 is fitted in one cam groove 7a located on an outer periphery side and a concave portion 6b formed on the second connecting member 6 is fitted in the other cam groove 7b located on an inner periphery side. A drive motor M is mounted at one corner (on Y2 and X2 side) of the disc unit, whereby the rotary cam 7 is rotated in the clockwise direction in the figure through a group of gears (not shown). As the rotary cam 7 rotates, the convex portions 5b and 6b move through the cam grooves 7a and 7b, respectively. With this movement, the first and second connecting members 5, 6 are pivotally moved clockwise or counterclockwise about the pivot shafts 5a and 6a, respectively.

Lugs 5c and 5d are formed respectively at both end portions of the first connecting member 5 and are inserted respectively into elongated holes 8a and 8a' which are formed respectively in lift members 8 and 8', the lift members 8 and 8' being disposed along side plates 1b and 1c, respectively, of the main housing 1. Likewise, lugs 6c and 6d are also formed respectively at both end portions of the second connecting member 6 and are inserted respectively into elongated holes 9a and 9a' which are formed in lift members 9 and 9a', respectively. The lift members 8 and 9 are disposed along the side plate 1b of the main housing 1 slidably in Y direction in the figure. As shown in FIG. 1B, crank slots 8b, 8c and 9b, 9c are formed in side plates of the lift members 8 and 9 which are bent to Z1 side. Likewise, as indicated with dotted lines in the figure, crank slots 8b', 8c' and 9b', 9c' are formed respectively in side plates of the lift portions 8' and 9' which are bent to Z1 side in the figure along the side plate 1c. The crank slots 8b and 8c are inclined upward on Y2 side, while the crank slots 8b' and 8c' are inclined downward on Y2 side. Similarly, the crank slots 9b and 9c are inclined downward on Y2 side, while the crank slots 9b' and 9c' are inclined upward on Y2 side. That is, the crank slots 8b, 8b', 9b and 9b' are in a asymmetrical relation on the right and left with the crank slots 8c, 8c', 9c and 9c', respectively. In the side plate 1b of the main housing 1 are formed elongated holes 1d and 1e in Z direction, which overlap the crank slots 8b and 8c. Also in the side plate 1c of the main housing 1 are formed elongated holes 1d' and 1e', in Z direction, which overlap the crank slots 8b' and 8c'.

Moving pins 12a and 12b projecting in X2 direction in the figure are provided in one side plate 2b of the ceiling board 2, while in the other side plate 2c of the ceiling board 2 there are provided moving pins 12a' and 12b' projecting in X1 direction in the figure. The moving pin 12a is inserted into both crank groove 8b and elongated hole 1d, while the moving pin 12b is inserted into both crank slot 8c and elongated hole 1e. These are also the case with the side plate 1c located on X1 side. The moving pin 12a' is inserted into both crank groove 8b' and elongated hole 1d', while the moving pin 12b' is inserted into both crank slot 8c' and elongated hole 1e'.

For example, when the rotary cam 7 rotates and the first connecting member 5 is pivotally moved counterclockwise in the figure, the lift member 8 moves in Y2 direction and the lift member 8' moves in Y1 direction. At this time, on the side plate 1b side, the moving pins 12a and 12b go down the slopes of the crank slots 8b and 8c, respectively, while on the side plate 1c side the moving pins 12a' and 12b' go down the slopes of the crank slots 8b' and 8c', respectively, so that the ceiling board 2 is brought down in Z2 direction. When the first connecting member 5 is pivotally moved clockwise, the lift member 8 moves in Y1 direction and the lift member 8' moves in Y2 direction, so that, reverse to the above, on the side plate 1b side the moving pins 12a and 12b go up the slopes of crank slots 8b and 8c, respectively, while on the side plate 1c side the moving pins 12a' and 12b' go up the slopes of crank slots 8b' and 8c', respectively. Consequently, the ceiling board 2 is moved up in Z1 direction.

The clamp chassis 3 is disposed between the main housing 1 and the ceiling board 2. Side plates 3a and 3a' of the clamp chassis 3 are provided with sideways projecting moving pins 13a, 13b and 13a', 13b', respectively. The moving pin 13a is inserted into a U-shaped slot 2d formed in the side plate 2b of the ceiling board 2 and also into the crank slot 9b formed in the lift member 9, while the moving pin 13b is inserted into a U-shaped slot 2e formed in the ceiling board side plate 2b and also into the crank slot 9c formed in the lift member 9. The moving pins 13a and 13b are further inserted respectively into elongated holes 2f and 2g formed in the side plate 1b of the main housing 1. This is also the case with the moving pins 13a' and 13b' on X1 side. Therefore, when the rotary cam 7 rotates and the second connecting member 6 is pivotally moved clockwise, the lift member 9 moves in Y1 direction and the lift member 9' moves in Y2 direction. At this time, the moving pins 13a and 13b on the side plate 3a side go down the slopes of crank slots 9b and 9c, respectively, while the moving pins 13a' and 13b' on the side plate 3a' side go down the slopes of crank slots 9b' and 9c', respectively, so that the clamp chassis 3 is brought down in Z2 direction. Conversely, when the second connecting member 6 is pivotally moved counterclockwise, the lift members 9 and 9' moves in Y2 and Y1 directions, respectively, so that the moving pins 13a and 13b go up the slopes of crank slots 9b and 9c, respectively, while the moving pins 13a' and 13b' on the side plate 3a' side go up the slopes of crank slots 9b' and 9c', respectively. Consequently, the clamp chassis 3 is moved up in Z1 direction.

Thus, the ceiling board 2 and the clamp chassis 3 are moved up in Z axis direction by means of the first and second connecting members 5, 6, respectively.

Figure 2A:
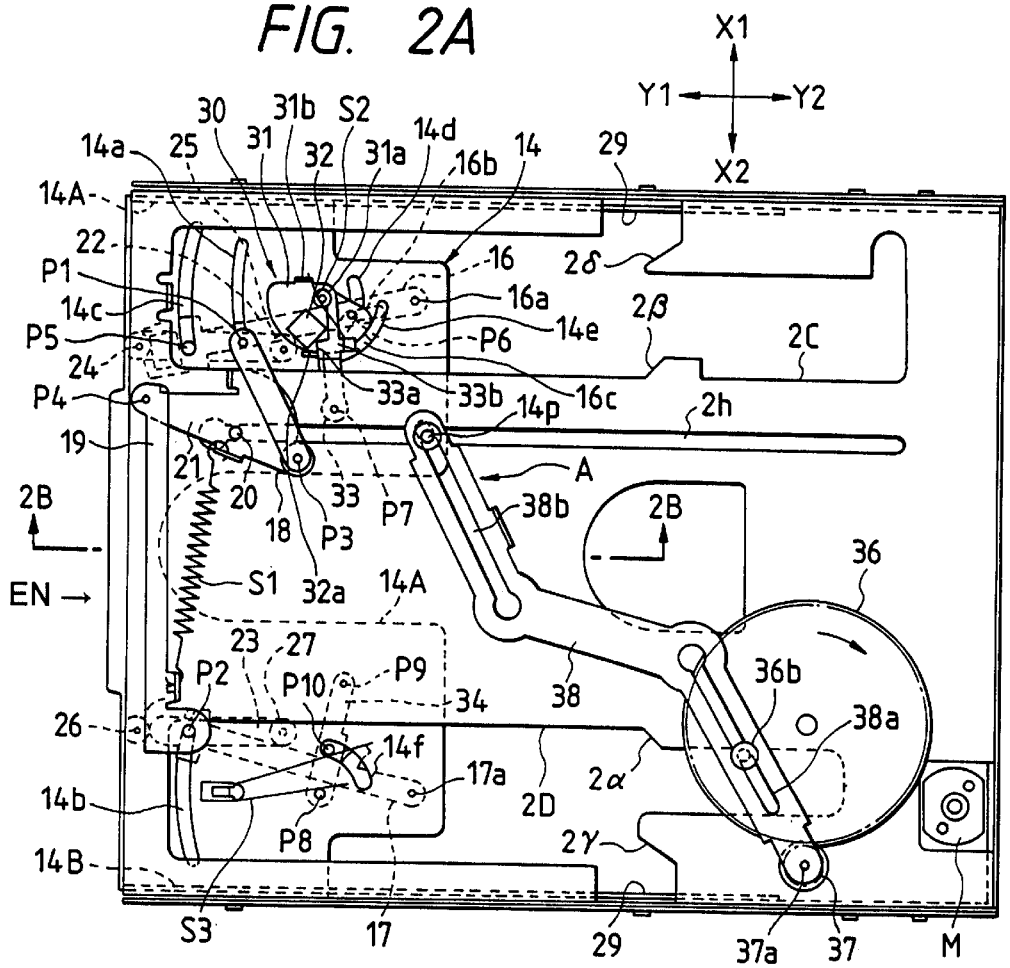
FIG. 2A is a plan view showing a ceiling board and FIG. 2B is an enlarged sectional view taken on line 2B—2B in FIG. 2A.
Figure 2B:
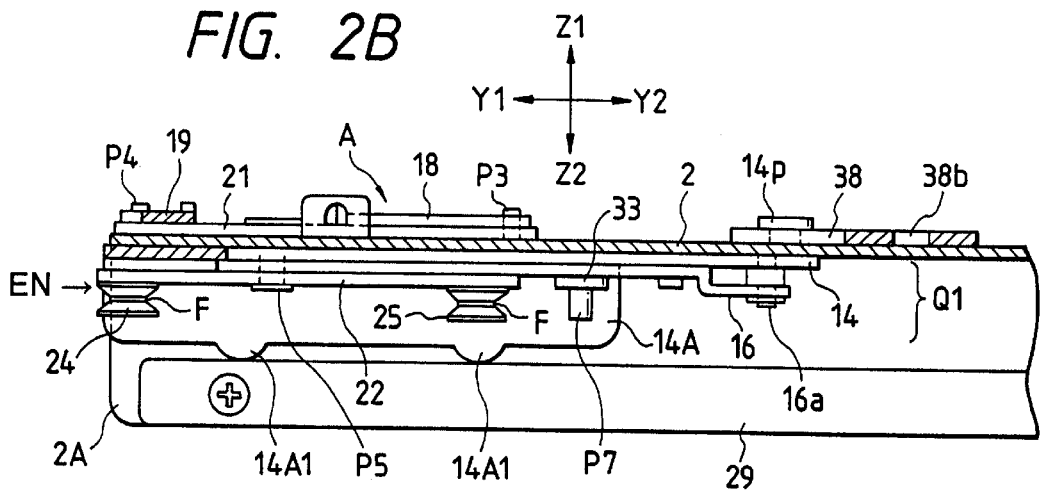

FIG. 2A is a plan view showing the details of the ceiling board 2 and FIG. 2B is an enlarged sectional view taken on line 2B—2B in FIG. 2A.

As shown in FIGS. 2A and 2B, the ceiling board 2 is provided with a conveying means A for conveying a disc toward the innermost portion of the disc unit. The conveying means A is mainly secured to a slide member 14 which is disposed inside the ceiling board 2, and it is movable in Y axis direction in an insertion area Q1 located on the ceiling board 2 side.

On the underside of the slide member 14 are disposed rotary arms 16 and 17 which are rotatable about pivot shafts 16a and 17a, respectively. The rotary arm 16 is connected through a connecting pin P1 to one end of a link member 18 which is disposed on the upper surface side of the ceiling board 2. The front end of the rotary arm 17 is connected through a connecting pin P2 to one end of a link arm 19 provided on the upper surface of the ceiling board 2. Connecting pins P1 and p2 are slidably inserted respectively into arcuate slots 14a and 14b formed in the slide member 14. The link member 18 and the link arm 19 are connected respectively through connecting pins P3 and P4 to both ends of a rotary link member 21 mounted rotatably on a pivot shaft 20, the pivot shaft 20 being implanted in the slide member 14 and inserted into a guide slot 2h formed in the ceiling board 2. The link arm 19 and the rotary link member 21 are connected with each other through a biasing member S1 such as a coiled spring. Since the rotary link member 21 is rotated clockwise as in FIGS. 2A and 2B, the link member 18 and the link arm 19 are urged in X2 and X1 directions, respectively. That is, the rotary arms 16 and 17 are pivotally moved toward each other.

As shown in FIG. 2B, a side plate 14A of the slide member 14 is formed with projecting support portions 14A1, 14A1, which are supported by a rail member 29 attached to the slide plate 2A of the ceiling board 2 and which are movable in Y direction along the rail member 29. This is also the case with the other side plate 14B side of the slide member 14.

At a front end of one rotary arm 16 is provided a support pin P5, which is inserted into an arcuate groove 14c formed in the slide member 14. Further, a support arm 22 is supported pivotally at the tip of the support pin P5, namely, on the underside of the slide member 14. Likewise, also at the tip of the connecting pin P2 is supported a support arm 23 which is pivotable along the underside of the slide member 14. Support pulleys 24, 25 and 26, 27 are rotatably supported respectively at both ends of the paired support arms (support members) 22 and 23.

On the upper surface of the slide member 14 adjacent to the rotary arm 16 there is provided a disc detecting mechanism 30. The disc detecting mechanism 30 comprises a generally sectorial rotary base 31, as well as a push switch 32 and a detection arm 33 which are mounted on the rotary base 31. The rotary base 31 is mounted on a pivot shaft 31a, with a restriction pin P6 projecting from the underside of the rotary base 31. The restriction pin P6 is inserted into an arcuate slot 14d formed in the slide member 14 and also into an elongated hole 16b formed in the rotary arm 16. The detection arm 33 is formed by bending a metallic plate and one end thereof is mounted on the pivot shaft 31a, while a bent opposite end thereof extends to the lower surface side of the slide member 14 through the interior of an arcuate slot 14e formed in the slide member 14. A detection pin P7 projecting toward the main housing 1 (in Z2 direction) is implanted in the opposite end of the detection arm 33 thus extended to the lower surface side of the slide member. As noted above, since the rotary arm 16 is pivotally moved counterclockwise, the elongated hole 16b presses the restriction pin P6 counterclockwise, so that the rotary base 31 is turned clockwise about the pivot shaft 31a. At a position opposed to the arcuate slot 14e is located a restriction piece 16c which is integral with a side portion of the rotary arm 16.

The detection arm 33 is formed with a pressing piece 33a and a retaining piece 33b by bending. The pressing piece 33a is opposed to a switch 32a of the push switch 32 provided on the rotary base 31. A biasing member S2 constituted by a wire spring or the like is anchored between the retaining piece 33b and a retaining piece 31b formed by bending on the rotary base 31. With the biasing force of the biasing member S2, the detection arm 33 undergoes a biasing force acting clockwise in the figure about the pivot shaft 31a. Consequently, the retaining piece 33b pushes the switch 32a, thus causing the push switch 32 to turn ON. As shown in FIG. 2A, a detection arm 34 is supported pivotably about a support pin P8 at a position adjacent to the rotary arm 17 and on the lower surface side of the slide member 14. At the tip of the detection arm 34 is provided a detection pin P9 and between the support pin P8 and the detection pin P9 is disposed a restriction pin P10. The detection pin P9, like the detection pin P7, is projected toward the main housing 1 (in Z2 direction) and can abut a disc D as will be described later. The restriction pin P10 is inserted into an arcuate slot 14f formed in the slide member 14. Between the support pin P8 and the restriction pin P10 is mounted a biasing member S3 such as a wire spring. With the biasing force of the biasing member S3, the detection arm 34 is turned counterclockwise in the figure about the support pin 8.

Figure 7:
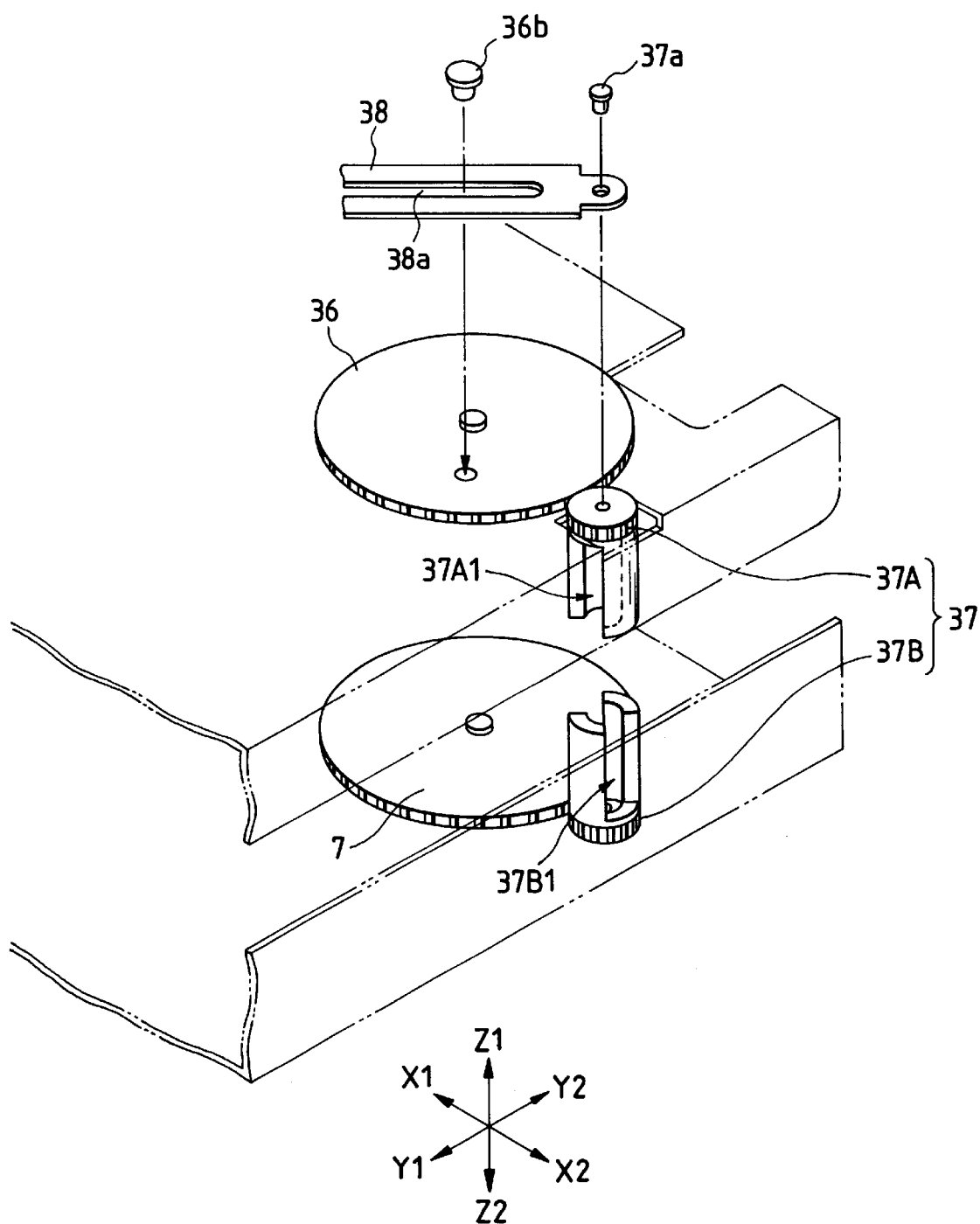
FIG. 7 is a perspective view showing a transfer gear.

The rotative driving force of the drive motor M is transmitted to the transfer gear 37 on the main housing 1 side through a group of gears (not shown). In this connection, reference is here made to FIG. 7 which is a perspective view of the transfer gear 37. As shown in the same figure, the transfer gear 37 is made up of an upper transfer gear 37A meshing with a large gear 36 disposed on the upper surface side of the ceiling board 2 and a lower transfer gear 37B meshing with the rotary cam 7. The upper and lower transfer gears 37A and 37B are provided with fitting portions 37A1 and 37B1, respectively, which come into engagement with each other in a spline fashion. In a mutually engaged state of both fitting portions, the upper transfer gear 37A is movable in the longitudinal direction (Z direction). Therefore, even where the ceiling board 2 has moved upward, as mentioned above, it is possible to transmit the driving force of the drive motor M from the lower transfer gear 37B to the upper transfer gear 37A, whereby the large gear 36 is always rotated in synchronism with the rotary cam 7.

One end of a conveying arm 38 is pivotably supported by a pivot shaft 37a which is fitted in an upper end face of the upper transfer gear 37A. The conveying arm 38 is formed by pressing a thin metallic plate and it has two sliding slots 38a and 38b formed therein, as shown in FIG. 2A. Into one sliding slot 38a is inserted a guide pin 36b which is implanted in the surface of the large gear 36, while in the other sliding slot 38b is inserted a connecting pin 14p, the connecting pin 14b being implanted in the slide member 14 and projecting to the upper surface side of the ceiling board 2 through the guide slot 2h. Therefore, when the large gear 36 is rotated, the guide pin 36b moves within the sliding slot 38a and the conveying arm 38 is turned about the pivot shaft 37a. As a result, the connecting pin 14p moves in Y axis direction in the figure within the guide slot 2h, whereby the slide member 14 can reciprocate between the disc insertion opening EN and the innermost portion of the disc unit.

Figure 3A:
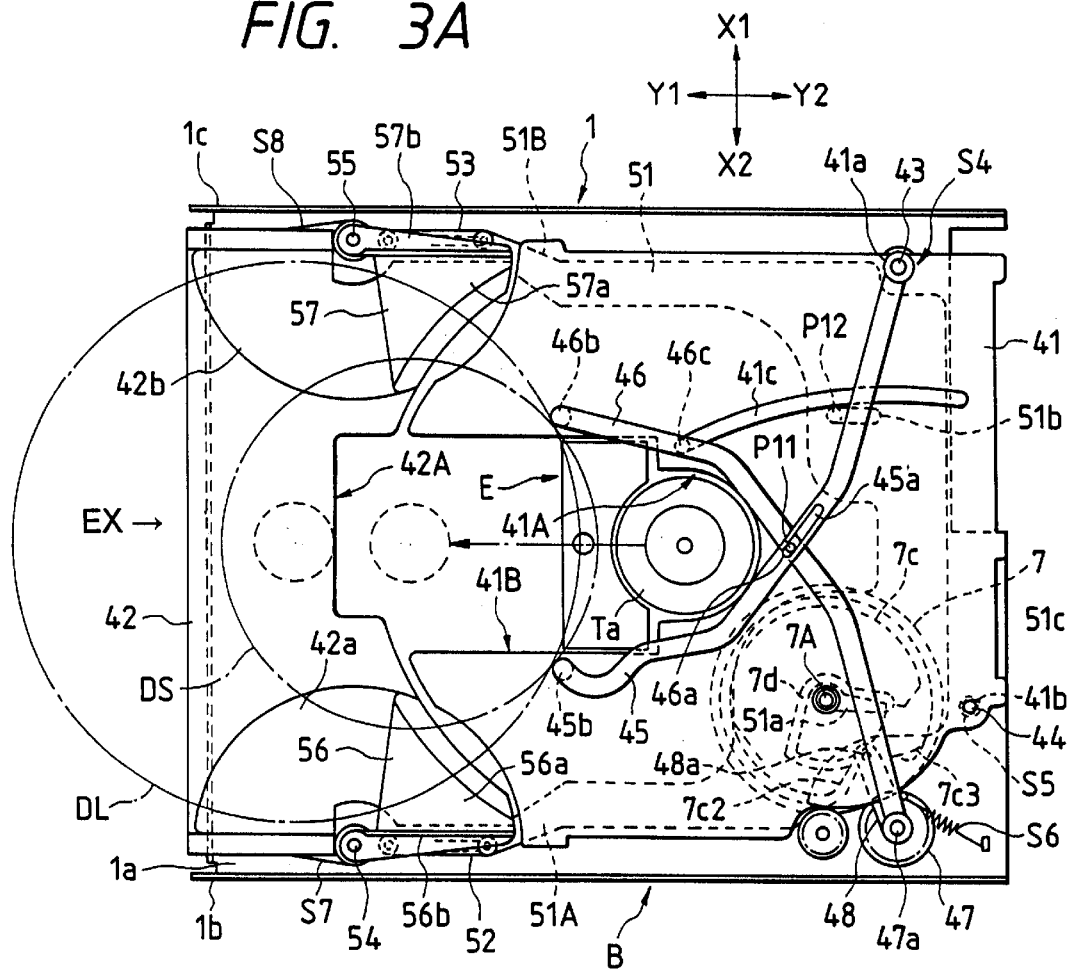
Figure 3B:
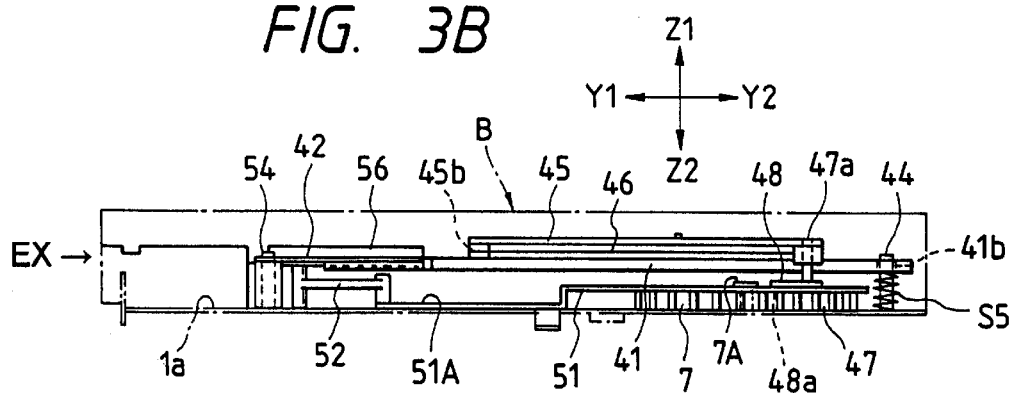
Figure 4:
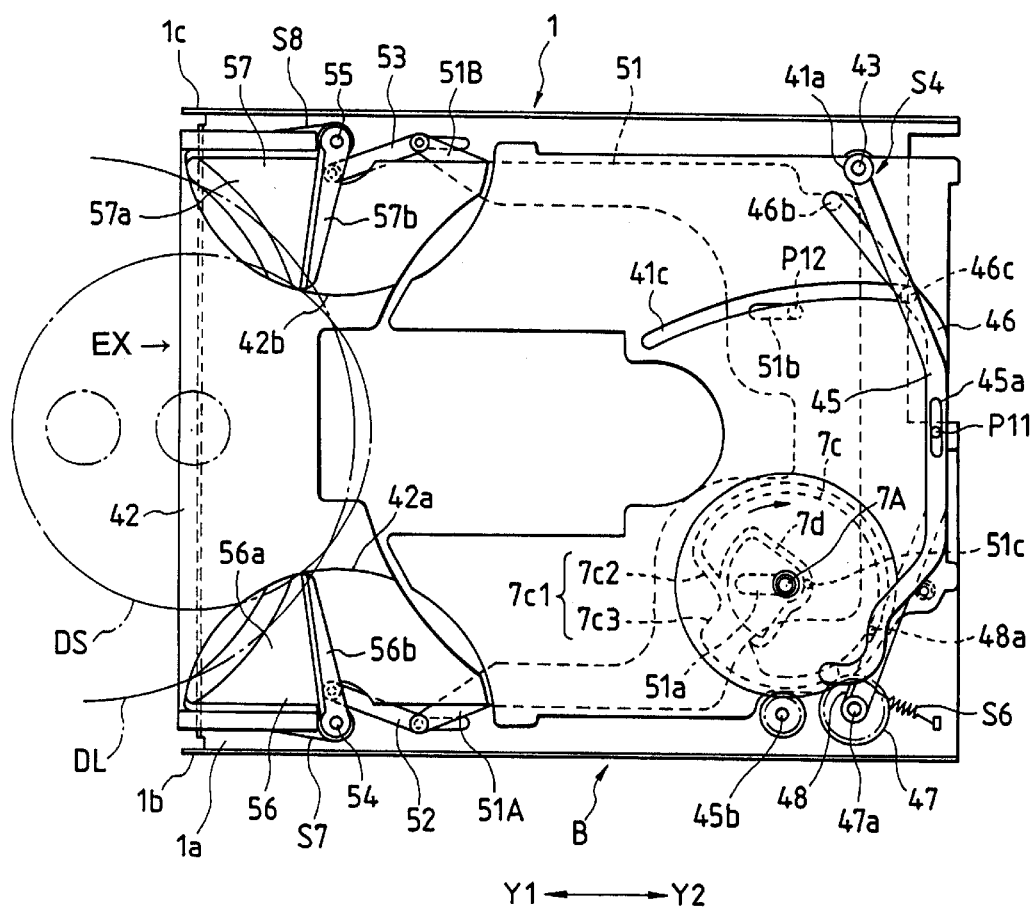
FIG. 4 is a plan view showing a retracted state of the disc ejecting means.

FIG. 3 illustrates a disc ejecting means, in which FIG. 3A is a plan view showing a state of ejection and FIG. 3B is a side view thereof, and FIG. 4 is a plan view showing a retracted state of the disc ejecting means.

The disc ejecting means shown in FIGS. 3 and 4 and indicated at B is disposed between the clamp chassis 3 and the main housing 1.

The disc ejecting means B comprises a moving table 41 side and a disc guide plate 42 side. When a disc is to be ejected, the moving table 41 functions to lift the disc resting on a turntable Ta and hold the disc temporarily in this state. Support rods 43 and 44 are implanted in the bottom 1a of the main housing 1, while through holes 41a and 41b are formed in the moving table 41. The through holes 41a and 41b are fitted on the support rods 43 and 44, respectively, whereby the moving table 41 is made movable vertically in Z direction in the figure. Biasing members S4 and S5 such as coiled springs are fitted on the support rods 43 and 44, respectively, which are located between the moving table 41 and the bottom 1a of the main housing 1, to urge the moving table 41 in Z1 direction. On the other hand, the disc guide plate 42 is fixed horizontally at a predetermined vertical position above the bottom 1a of the main housing 1.

On the upper surface of the moving table 41 are disposed ejection arms 45 and 46 in such shapes as shown in FIG. 3A, the ejection arms 45 and 46 constituting the first ejection member. The ejection arm 45 is connected to an upper end of the support rod 43 pivotably and vertically to be movable. The ejection arm 46 is mounted at one end thereof on a central shaft 47a together with a small gear 47 and a driven arm 48, the central shaft 47a being located at a position adjacent to the rotary cam 7. The ejection arm 46 is located on the upper surface (Z1) side of the moving table 41 and is pivotable and vertically movable with respect to the central shaft 47a. On the other hand, the small gear 47 and the driven arm 48 are located on the lower surface (Z2) side of the moving table 41, the small gear 47 being in mesh with the gear grooves of the rotary cam 7. At the tip of the driven arm 48 is formed a convex portion 48a, which is inserted into a cam groove 7c formed in the upper surface of the rotary cam 7. The ejection arm 46 and the driven arm 48 are coaxial (on the central shaft 47a) and engaged with each other. Both rotate in an integral manner. A biasing member S6 is anchored to the driven arm 48 to urge the driven arm clockwise at all times. It follows that the ejection arm 46 is also urged clockwise at all times.

The ejection arms 45 and 46 cross each other in a three-dimensional manner and are interconnected at the crossing position. More specifically, an elongated hole 45a is formed at the center of the ejection arm 45, while a through hole 46a is formed in the ejection arm 46, and a connecting pin P11 is loosely inserted through both elongated hole 45a and through hole 46a to connect both ejection arms with each other. At an intermediate position between a pressing portion 46b formed at the tip of the ejection arm 46 and the through hole 46a there is formed a convex portion 46c which projects in Z2 direction and which is inserted into a guide slot 41c formed arcuately in the moving table 41.

In the upper surface of the rotary cam 7 are formed the cam groove 7c on an outer periphery side and a cam groove 7d on an inner periphery side, and the convex portion 48a of the driven arm 48 is fitted in the cam groove 7c as noted above, while in the cam groove 7d is fitted a convex portion 51c of an ejection slider 51 to be described later. The cam groove 7c is formed with a chevron-shaped groove 7c1 (see FIG. 4) projecting toward the rotating shaft 7A. When the rotary cam 7 is rotated clockwise and the convex portion 48a moves to the top of the chevron-shaped groove along an ascent slope 7c2 of the same groove, the driven arm 48 is pivotally moved counterclockwise. Since the driven arm 48 and the ejection arm 46 are integral with each other, as described above, the ejection arm 46 is also moved pivotally counterclockwise, with the result that the tip of the ejection arm 46 moves and is extended in Y1 direction in the figure. At this time, the ejection arm 45, which is connected to the ejection arm 46 through the connecting pin P11, is also extended in Y1 direction, so that the disc unit assumes such a state of ejection as shown in FIG. 3A.

As the rotary cam is further rotated clockwise, the convex portion 48a passes the top of the chevron-shaped groove 7c1 and then moves along a descent slope 7c3 of the chevron-shaped groove 7c1 by virtue of the biasing member S6, thus causing the driven arm 48 to move pivotally in the clockwise direction. Consequently, reverse to the above, both ejection arms 45 and 46 are moved and retracted in Y2 direction, thus assuming such a retracted state as shown in FIG. 4.

The extension and retraction of the first ejection member (the ejection arms 45 and 46) are each conducted once during one rotation of the rotary cam 7. The descent slope 7c3 is steeper than the ascent slope 7c2. Besides, the driven arm 48 undergoes the biasing force of the biasing member S2. Therefore, the retracting motion of the first ejection member is performed in a short time.

Pressing portions 45b and 46b are formed at the opposite ends, or the tips, of the ejection arms 45 and 46, respectively, so as to be opposed to an edge portion of the disc rested on the moving table 41. Therefore, when the ejection arms 45 and 46 shift from the retracted state to the state of ejection, the pressing portions 45b and 46b act to push out the disc edge toward the ejection opening (EX) side, whereby the disc D can be moved in Y1 direction.

Referring now to FIGS. 3A, 3B and 4, an ejection slider 51 is disposed between the moving table 41 and the rotary cam 7. A pair of elongated holes 51a and 51b are formed in the ejection slider 51 and the rotating shaft 7A of the rotary cam 7 is inserted into one elongated hole 51a. Into the other elongated hole 51b is inserted the tip of a support pin P12 implanted in the bottom 1a. The ejection slider 51 is slidable in Y axis direction in the figure while being guided by the elongated holes 51a and 51b. Further, the ejection slider 51 is formed with a convex portion 51c projecting in Z2 direction, the convex portion 51c being inserted into the cam groove 7d formed in the surface of the rotary cam 7. With rotation of the rotary cam 7, the ejection slider 51 reciprocates in Y axis direction.

Link levers 52 and 53 are pivotably provided at left and right front end portions 51A, 51B, respectively, of the ejection slider 51, and through the link levers 52 and 53 the ejection slider 51 is connected to the second ejection member which will be described later. The link levers 52 and 53 are secured pivotably through pivot shafts to the undersides of ejection levers 56 and 57, respectively, which will be described later.

Generally semicircular, stepped recesses 42a and 42b are formed in end portions in X2 and X1 directions, respectively, of the disc guide plate 42, and pivot shafts 54 and 55 are implanted in the bottom 1a of the main housing 1 at central positions of the stepped recesses 42a and 42b, respectively. The ejection levers 56 and 57 which constitute the second ejection member are supported by the pivot shafts 54 and 55, respectively, so that respective receiving portions 56a and 57a, which are formed in a generally triangular shape, can move pivotably within the stepped recesses 42a and 42b, respectively.

On one sides of the ejection levers 56 and 57 are formed push-out pieces 56b and 57b, respectively, which project in Y2 direction in the figure from the pivot shafts 54 and 55, respectively. The ejection levers 56 and 57 are provided with biasing members S7 and S8, respectively, which are formed by wire springs or the like coaxial with the pivot shafts 54 and 55. With the biasing members S7 and S8, the ejection levers 56 and 57 are biased clockwise and counterclockwise, respectively.

When the ejection slider 51 is moved in Y1 direction, the link levers 52 and 53 also move in the same direction. Consequently, the ejection levers 56 and 57 are pivotally moved counterclockwise and clockwise, respectively, whereby such a closed state as shown in FIG. 4 can be obtained. Conversely, when the ejection slider 51 is moved in Y2 direction, the link levers 52 and 53 are also moved in the same direction, so that the ejection levers 56 and 57 are pivotally moved clockwise and counterclockwise, respectively, whereby there can be obtained an open condition with both ejection levers 56 and 57 forced open toward the innermost portion (Y2 direction) of the disc unit.

The first and second ejection members referred to above are for ejecting the disc D in an ejection area underlying the foregoing insertion area Q1, that is, in an area corresponding to the ejection opening EX indicated in FIGS. 3A and 3B.

As shown in FIG. 3, a recess 41A is formed in the moving table 41 by cutting out the same table in a semicircular shape, and a disc driving section E is disposed in the recess 41A. To be more specific, the turntable Ta is disposed in an opposed relation to the clamper shown in FIG. 1B. A cut-out concave portion 41B is formed in the moving table 41 and a like concave portion 42A is formed in the disc guide plate 42, and a pickup which carries an optical head or a magnetic head is disposed in the concave portions 41B and 42B. The pickup is slidably supported on a guide shaft or the like extending in Y axis direction and disposed parallel with the pickup in the figure so that the pickup can move toward the center of the turntable Ta. With the pickup, the disc held between the turntable Ta and the clamper 4 can be subjected to reproducing or recording.

The following description is now provided about the operation of the disc constructed as above.

Initial State before Insertion of Disc

In an initial state before insertion of a disc into the disc unit, the first ejection member (ejection arms 45 and 46) is in its retracted state, while the second ejection member (ejection levers 56 and 57) is in its expanded state. The ceiling board 2, clamp chassis 3 and moving table 41 are all in their lowered positions (clamped state) on Z2 side, with the slide member 14 being positioned on the insertion opening (Y1) side.

Disc Inserting Operation (i) Small-diameter Disc

Figure 5:
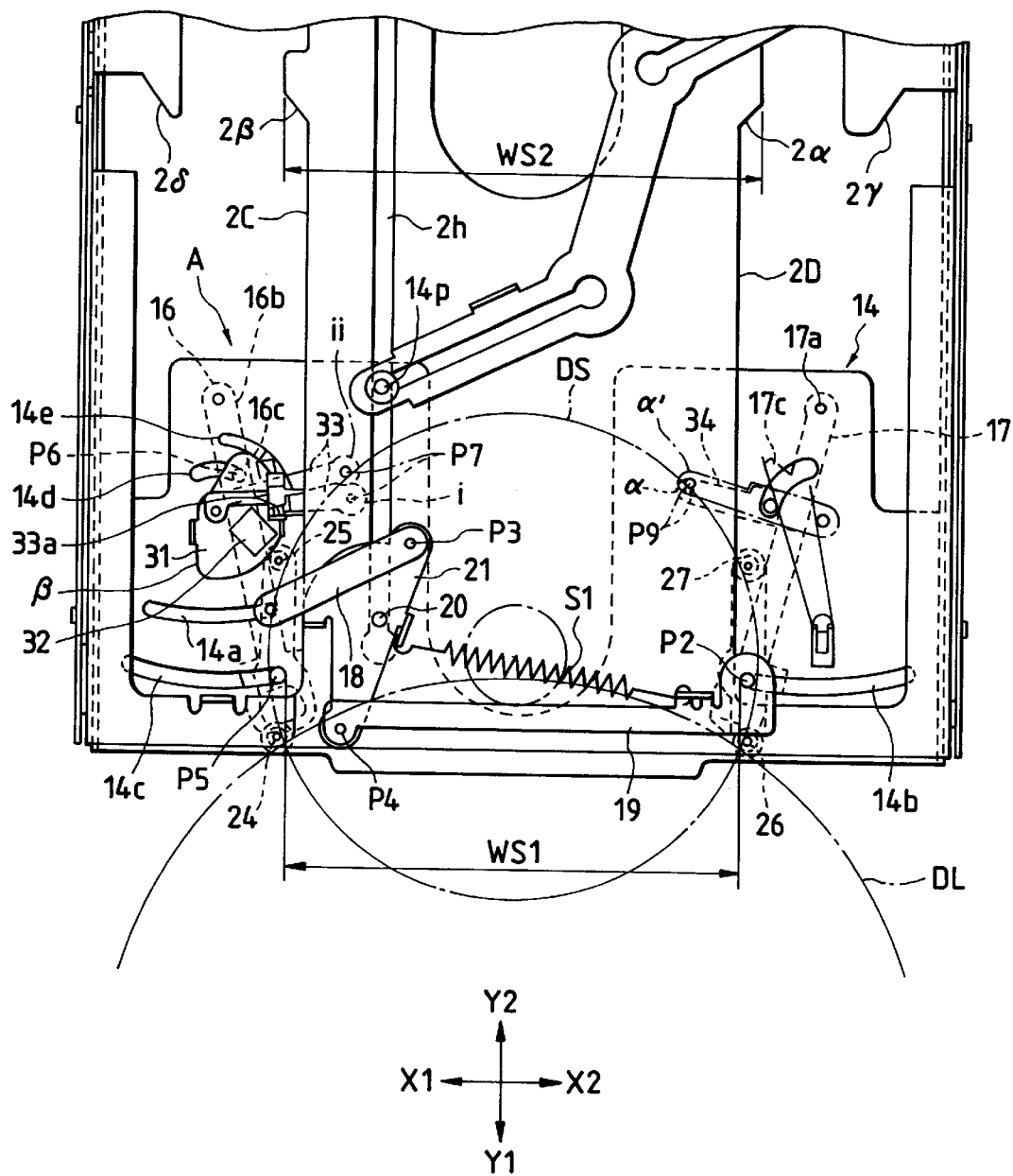
FIG. 5 is an enlarged plan view showing a gripped state of a small-diameter disc.

FIG. 5 is an enlarged plan view showing a small-diameter disc as held by the disc conveying means.

As shown in the same figure, when a small-diameter disc (8 cm) DS is inserted from the insertion opening on Y1 side, an edge portion of the disc DS is held from both sides by flanges F (see FIG. 2B) of the support pulleys 24, 26 which are installed on the front end side of the insertion opening EX. As a result, the support arms 22 and 23 are pivotally moved along the small-diameter disc edge. With further insertion of the disc DS in Y2 direction, the edge portion of the disc DS on the front end side is held by the support pulleys 25 and 27 located on the innermost portion of the disc unit, so that the whole of the small-diameter disc DS is supported by a total of the four support pulleys 24, 25, 26 and 27.

Since the detection pins P7 and P9 are disposed in the region of the small-diameter disc DS thus supported, as shown in FIG. 5, the disc edge comes into abutment against both pins P7 and P9. Consequently, the detection arm 33 having the detection pin P7 is pivotally moved counterclockwise and at the same time the detection arm 34 having the detection pin P9 is pivotally moved clockwise. However, since the restriction piece 16c of the rotary arm 16 is positioned within the rotational range of the detection arm 33, the arm 33 moves pivotally from its position indicated by the reference mark i up to its position indicated by the reference mark ii in which the arm comes into abutment against the restriction piece 16c. Likewise, the detection arm 34 having the detection pin P9 also moves pivotally from its position indicated by the reference mark α up to its position indicated by the reference mark α' in which the arm 34 comes into abutment against the restriction piece 17c. That is, the insertion of the small-diameter disc DS is completed when the detection pins P7 and P9 pushed by the edge portion of the disc have reached the respective positions ii and α'.

Upon pivotal movement of the detection arm 33, the pressing force exerted on the switch 32a by the pressing piece 33a is released, so that an OFF signal is outputted from the push switch 32, whereby in the disc unit it is possible to detect that the new small-diameter disc DS has been held by the support pulleys 24, 25, 26 and 27.

In the event the second disc D2 should become disengaged from the support pulleys 24, 25, 26 and 27 artificially or due to some trouble after the disc holding, an ON signal is again outputted from the push switch 32, whereby it is possible to detect disengagement of the disc from the support pulleys or a trouble, if any, during disc conveyance.

(ii) Large-diameter Disc

Figure 6:
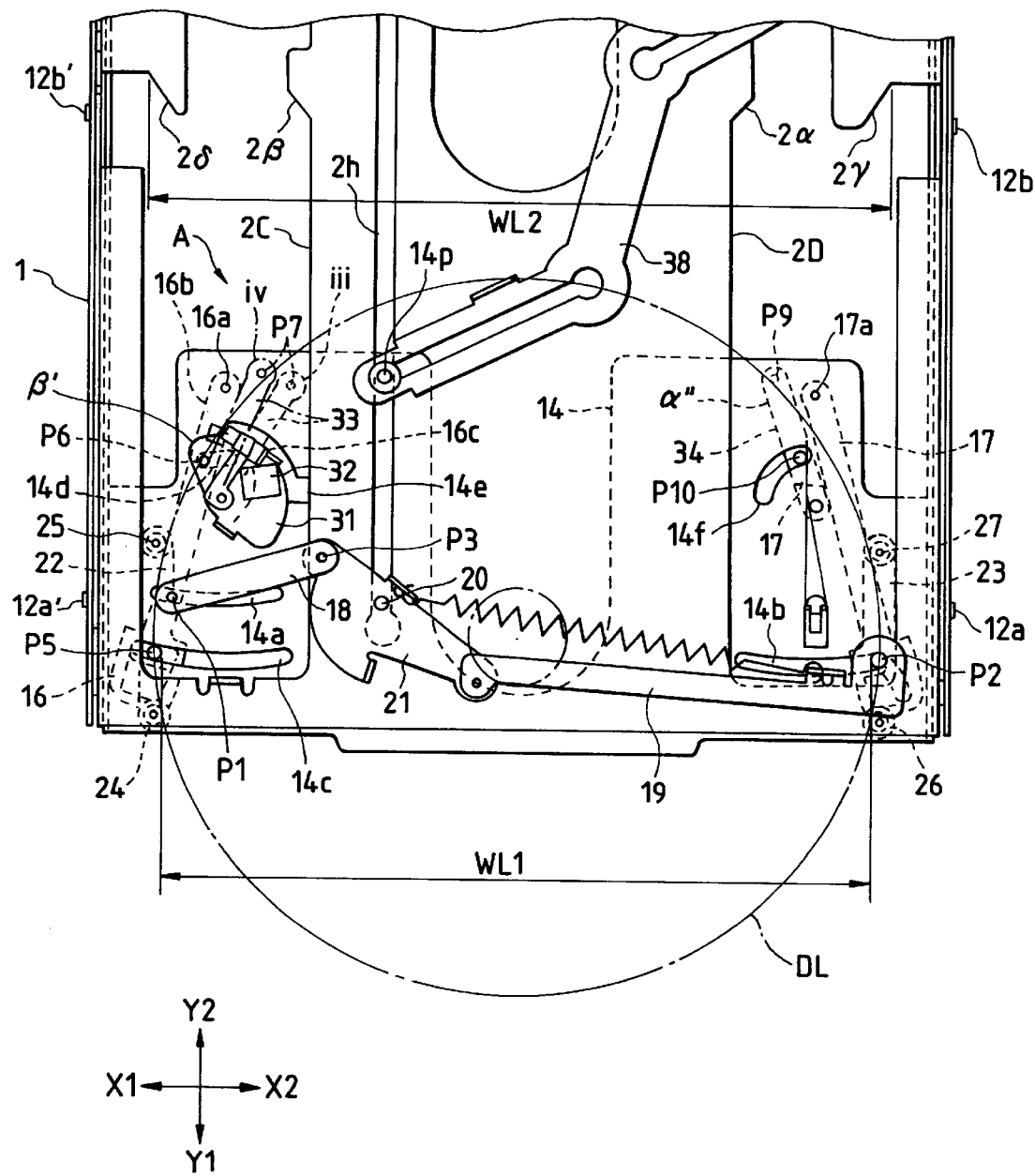
FIG. 6 is an enlarged plan view showing a gripped state of a large-diameter disc.

FIG. 6 is an enlarged plan view showing a large-diameter disc as held by the disc conveying means.

As shown in the same figure, when a large-diameter disc (12 cm) DL is inserted into the insertion opening, the front edge of the disc DL comes into abutment against the flange portions of the support pulleys 24 and 26, so that the support arms 22 and 23 are pivotally moved clockwise and counterclockwise, respectively, to slightly widen the distance between both pulleys 24 and 26. Further, upon insertion of the large-diameter disc DL, the support pulleys 24 and 26 rotate along the edge portions of the disc and the rotary arms 16 and 17 are forced open in X1 and X2 directions, respectively. In this case, the rotary arms 16 and 17 are pivotally moved through the link members 18 and 19, centered on the rotary link member 21, as noted previously, whereby both rotary arms 16 and 17 are forced open equally right and left. Thus, the large-diameter disc DL can be inserted rectilinearly toward the innermost portion of the disc unit (in Y2 direction).

In connection with the above operation, the support arms 22 and 23 are pivotally moved suitably about the support pin P5 and connecting pin P2, and the rotary arms 16 and 17 also rotate pivotally, whereby the edge portion of the large-diameter disc DL is held by the four support pulleys 24, 25, 26 and 27.

With the pivotal movement of the rotary arm 16, the elongated hole 16b of the rotary arm 16 pushes the restriction pin P6 in X1 direction, so that the rotary base 31 is pivotally moved counterclockwise about the pivot shaft 31a. At the same time, the restriction piece 16c deviates from its position opposed to the arcuate slot 14e. As a result, the detection arm 33 is no longer in abutment against the restriction piece 16c, thus permitting a counterclockwise rotation of the rotary base 31. More particularly, the rotary base 31 is rotated from its position indicated by the reference mark β in FIG. 5 to its position indicated by the reference mark β' in FIG. 6. Further, with counterclockwise rotation of the rotary base 31, the detection arm 33 shifts from its state of the reference mark i in FIG. 5 to its state of the reference mark iii in FIG. 6, but at the same time the detection pin P7 is pushed by the edge portion of the large-diameter disc DL, so that eventually the detection arm 33 is pivotally moved up to its position of the reference mark in which it is restricted by an end portion of the arcuate slot 14e. Likewise, the detection pin P9 of the other detection arm 34 is also pushed by the edge portion of the disc DL, so that the detection arm 34 is pivotally moved from the position a in FIG. 5 to its position α" in FIG. 6. When the detection arm 33 is rotated from the position iii to the position iv, only the detection arm 33 is rotated, while the rotary base 31 is not rotated but remains in its state of β'. Consequently, the pressing force exerted on the switch 32a by the pressing piece 33a is released and an OFF signal is outputted from the push switch 32, so that in the disc unit it is possible to detect that the new large-diameter disc DL has been held by the support pulleys 24, 25, 26 and 27.

The insertion of the large-diameter disc DL is completed when the detection pins P7 and P9 pushed by the disc edge have reached the respective positions iv and α".

Disc Inserting Operation 1

In the following description, the new small-diameter disc DS and large-diameter disc DL held by the support pulleys 24, 25, 26 and 27 are assumed to be second discs D2 unless otherwise mentioned.

In the disc inserting operation, as described above, when an OFF signal from the push switch 32 is detected, a spindle motor (not shown) of the disc driving section E is turned OFF to terminate the reproducing or recording operation for the disc inserted previously ("the first disc" hereinafter) which operation has so far been conducted. Subsequently, with rotation of the drive motor M, the rotary cam 7 starts rotating, and on the innermost side of the disc unit the clamp chassis 3 is raised to unclamp the disc. To be more specific, as mentioned previously, the second connecting member 6 is pivotally moved counterclockwise, the lift member 9 is moved in Y2 direction, and the lift member 9' is moved in Y1 direction. As a result, the moving pins 13a and 13b go up the slopes of the crank slots 9b and 9c, respectively, while the moving pins 13a' and 13b' located on the side plate 3a' side go up the slopes of the crank slots 9b' and 9c', so that the clamp chassis 3 rises in Z1 direction to unclamp the disc. In interlock with this rising motion of the clamp chassis 3, the moving table 41 rises in Z1 direction under the action of the biasing members S4 and S5 and so does the first ejection member.

As described above, with movement in Y2 direction of the slide member 14, the second disc D2 (the small or large-diameter disc DS or DL) held by the support pulleys 24, 25, 26 and 27 is transferred to the innermost portion of the disc unit.

As shown in FIG. 2, the rotative driving force of the drive motor is transmitted to the transfer gear 37 via the foregoing group of gears, causing the large gear 36 to rotate clockwise. At this time, the guide pin 36b moves through the sliding slot 38a and causes the conveying arm 38 to pivotally move clockwise. Further, the connecting pin 14p is moved in Y2 direction through the guide slot 2h, so that the slide member 14 connected to the connecting pin 14p is moved toward the innermost portion of the disc unit. During this movement of the slide member 14, the disc D2 is held by the support pulleys 24, 25, 26 and 27.

In the ceiling board 2 are formed openings 2C and 2D which are long in Y direction, as shown in FIGS. 2A, 2B, 5 and 6. Nearly central of the openings 2C and 2D are formed tapered portions 2α, 2β, 2γ and 2δ.

In the case where the second disc D2 is the small-diameter disc DS, the connecting pin P2 and the tapered portion 2α are opposed to each other and so are the support pin P5 and the tapered portion 2β. Given that the width between the connecting pin P2 and the support pin P5 in the conveying means A, which holds the small-diameter disc DS, is WS1 and the width between the tapered portions 2α and 2β is WS2, there exists a relationship of WS1<WS2. Therefore, when the slide member 14 moves toward the innermost portion of the disc unit (in Y2 direction), with the small-diameter disc DS held by the conveying means A, the connecting pin P2 and the support pin P5 come into abutment against the tapered portions 2α and 2 β, respectively, whereupon the disc inserting operation of the slide member 14 is stopped temporarily.

On the other hand, where the second disc D2 is the large-diameter disc DL, the connecting pin P2 and the tapered portion 2γ are opposed to each other and the support pin P5 and the tapered portion 2δ are opposed to each other. Given that the width between the connecting pin P2 and the support pin P5 in the conveying means A, which hold the large-diameter disc DL, is WL1 and the width between the tapered portions 2γ and 2δ is WL2, there exists a relationship of WL1<WL2.

When the slide member 14 is moved toward the innermost portion of the disc unit (in Y2 direction) while the large-diameter disc DL is held by the conveying means A, the connecting pin P2 and the support pin P5 come into abutment against the tapered portions 2γ and 2δ, respectively. As is the case with the small-diameter disc DS, when the connecting pin P2 and the support pin P5 have abutted the tapered portions 2γ and 2δ, the disc inserting operation of the slide member 14 is temporarily stopped.

The second disc D2 after insertion, irrespective of whether it is the small- or large-diameter disc DS or DL, is positioned between the clamper 4 and the turntable Ta. At the temporarily stopped position of the slide member 14, a support hub of the turn table Ta is located substantially just under a center hole of the second disc D2 and the clamper 4 is located substantially just above the center hole.

Disc Ejecting Operation

As described above, while the disc inserting operation is performed in the insertion area Q1 on the upper portion side of the disc unit, there is performed the disc ejecting operation on the lower portion side simultaneously with the disc inserting operation.

On the moving table 41 which has risen in interlock with the rising motion of the clamp chassis 3 there is rested the first disc D1 previously inserted and having been subjected to reproducing or recording. Then, upon rotation of the rotary cam 7, the ejection arms 45 and 46 which have so far been retracted as noted above are extended in Y1 direction as in the figure. As a result, the pressing portions 45b and 46b formed at the front ends of the ejection arms 45 and 46 push the first disc D1 on the moving table 41 toward the ejection opening EX (in Y1 direction) up to the operating region of the ejection levers 56 and 57 to be described. The ejection arms 45 and 46 are restored to their retracted state immediately after the shift from their retracted state to their extended state as mentioned above (see FIG. 4).

With further rotation of the rotary cam 7, the ejection levers 56 and 57, which are in their expanded state, move pivotally into their closed state. More specifically, the ejection slider 51 is moved in Y1 direction through the convex portion 51c which is fitted in the cam groove 7d of the rotary cam 7, as described above, whereby the link levers 52 and 53 are moved in Y1 direction, so that the ejection levers 56 and 57 are brought into their closed state. At this time, the edge portion of the first disc D1 located on the innermost portion of the disc unit is pushed out in Y1 direction by the pushout pieces 56b and 57b of the ejection levers 56 and 57, resulting in that the first disc D1 is ejected to the exterior of the disc unit through the ejection opening EX. Thus, the ejection levers 56 and 57 play the role of conducting the first disc D1, which has been pushed out from above the turntable Ta by the ejection arms 45 and 46, further up to the ejection opening EX.

Even if the first disc D1 thus conducted up to the ejection opening EX is pushed inside in Y2 direction, the ejection levers 56 and 57, which are in their closed state, are never forced open because the pushing motion results in a reverse rotation being imparted to the rotary cam 7. Therefore, the disc once ejected can be prevented from being again inserted into the disc unit.

Disc Inserting Operation 2

As set forth above, when the new second disc D2 is inserted from the insertion opening EN, the first disc D1 which has so far been subjected to reproducing or recording in the disc unit is ejected from the ejection opening, with no first disc D1 being now present on the turntable Ta. It is the new second disc D2 which has been held and inserted by the conveying means A that is now held between the clamper 4 and the turntable Ta.

In this state, with a further rotation of the rotary cam 7, the ceiling board 2 and the clamp chassis 3 are moved down in Z2 direction to clamp the second disc D2.

Thus, when the first connecting member 5 is pivotally moved counterclockwise with rotation of the rotary cam 7, as set forth above, the lift members 8 and 8' are moved in a relative manner, and the moving pins 12a and 12b located on the side face 1b side go down the slopes of the crank slots 8b and 8c, respectively, while the moving pins 12a' and 12b' located on the side face 1c side go down the slopes of the crank slots 8b' and 8c', respectively, whereby the ceiling board 2 is brought down. Likewise, when the second connecting member 6 is pivotally moved clockwise, the lift members 9 and 9' are moved in a relative manner, and the moving pins 13a and 13b located on the side face 3a side go down the slopes of the crank slots 9b and 9c, respectively, while the moving pins 13a' and 13b' located on the side plate 3a' side go down the slopes of the crank slots 9b' and 9c', respectively, whereby the clamp chassis 3 is brought down. With this descent of the clamp chassis 3, the center hole of the second disc D2 is fitted on the support hub of the turntable Ta and the disc is clamped by both clamper 4 and turntable Ta. As the clamp chassis 3 moves down, the moving table 41 and the first ejection member are also brought down in Z2 direction.

This clamping operation is performed while the second disc D2 is held by the support pulleys 24, 25, 26 and 27. Consequently, the edge portion of the second disc D2 is held by the support pulleys 24, 25, 26 and 27, with only the center hole portion of the disc being pressed down toward the turntable Ta, so that the disc is clamped while the central portion of the disc is slightly curved in a downwardly (in Z2 direction) convex shape.

When the clamping operation for the second disc D2 is over, the movement of the slider member 14 in the disc inserting direction is restarted. That is, from the above temporarily stopped state of the disc inserting operation, the slider 14 is restarted to move toward the innermost portion of the disc unit.

Where the second disc D2 is the small-diameter disc DS, the connecting pin P2 is forced open in X2 direction by the tapered portion 2α and at the same time the support pin P5 is forced open in X1 direction by the tapered portion 2β. Consequently, the width WS1 between the connecting pin P2 and the support pin P5 is enlarged up to the width WS2 between the tapered portions 2α and 2β, so that the space between the support pulleys 24, 25 and the spport pulleys 26, 27 also become larger. As a result, the small-diameter disc DS is disengaged from the support pulleys 24, 25, 26 and 27 and is clamped on the turntable Ta in a horizontal posture.

On the other hand, where the second disc D2 is the large-diameter disc DL, the connecting pin P2 is forced open in X2 direction by the tapered portion 2γ and the support pin P5 is forced open in X1 direction by the tapered portion 2 δ, so that the width WL1 between the connecting pin P2 and the support pin P5 is enlarged up to the width WL2 between the tapered portions 2α and 2β. Consequently, as is the case with the small-diameter disc DS, the large-diameter disc DL is disengaged from the support pulleys 24, 25, 26 and 27 and assumes a horizontal posture on the turntable Ta.

Reproducing or Recording Operation

When the new second disc D2 is clamped on the turntable Ta in the manner described above, the spindle motor in the disc driving section E starts rotating and the rotation of the motor is imparted to the second disc D2. Then, the pickup is moved radially of the disc to effect reproducing or recording for the second disc D2.

On the other hand, the first disc D1 which has been ejected to the ejection opening EX side is in a manually removable state. In the vicinity of the ejection opening EX is disposed a sensor (a photosensor for example) for detecting whether the disc is extant or not. If the answer is affirmative, there is performed disc reproducing or recording while the slider member 14 which has been moved toward the innermost portion of the disc unit stays the same.

On the other hand, if it is detected by the aforesaid sensor that the first disc D1 has been removed from the ejection opening EX, rotation is further imparted to the rotary cam 7, whereby the slider member 14 is moved toward the insertion opening EN (in Y1 direction) and the ejection slider 51 is moved in the same direction to shift the ejection levers 56 and 57 as the second ejection members into their expanded state. Thus, the disc unit is again set to the initial state, which is a stand-by state waiting for insertion of the next new disc.

According to the present invention described in detail hereinabove, it is possible to shorten the time required for disc replacement.

Besides, since it is possible to effect the ejection of disc without using a conveying roller, the disc surface can be prevented from being flawed.

Further, since the moving table moves up and down, the disc clamping and unclamping operations can be done positively.

What is claimed is:

1. A disk unit comprising:
    a main housing having a turntable installed therein, the turntable being substantially vertically stationary;
    a ceiling board arranged within said main housing, said ceiling board vertically movable with respect to the turntable;
    an insertion area disposed between the ceiling board and the turntable, having an insertion opening in which discs are inserted;
    an ejection area disposed between the ceiling board and the turntable, having an ejection opening in which discs are ejected, the ejection area disposed below the insertion area;
    a clamper chassis having a clamper provided therein and vertically movable between the turntable and the ceiling board, the clamper clamping a disc disposed thereon;
    a slide member slidably arranged in the ceiling board, the slide member having a plurality of support pulleys and holding a second disc inserted from the insertion opening, the second disc being held at an outer circumferential edge of the second disc by said plurality of support pulleys and being fed into an internal region of said insertion area by said slide member, said slide-member slideable in a conveying direction of the second disc with respect to said ceiling board, said slide member arranged at the insertion opening when the second disc is inserted;
    a movable table vertically movable within the ejection area and disposed below the clamper chassis, the movable table becoming a lower layer of the insertion area to raise a first disc installed on the turntable along with an inserting operation of the second disc with the slide member; and
    an ejection mechanism disposed on the moving table and abutted against an outer circumferential edge of the first disc to convey the first disc to the ejection opening;
    wherein the clamper chassis ascends when the second disc is inserted in the insertion opening and causes the clamper pressing the first disc to be positioned above the insertion area, the slide member is conveyed to the internal region of the insertion area while the second disc is held by the plurality of support pulleys and disposed between the turntable and the clamper, the ceiling board and clamper chassis then descend together to clamp the second disc with the clamper and the turntable along with the first disc being transferred to the ejection opening by the election mechanism.

2. A disc unit according to claim 1, wherein said ejection mechanism comprises a first ejection member to move the first disc from the turntable toward said ejection opening by a predetermined distance and a second ejection member to push out the first disc having thus moved by the predetermined distance further to the ejection opening.

3. A disc unit according to claim 2, the first ejection member comprising a pair of arms, the pair of arms crossing and pivotably provided substantially in a center of each of the pair of arms such that a substantially X-shaped structure is formed, the pair of arms extendable and retractable.

4. A disc unit according to claim 2, the second ejecting member comprising a pair of ejection levers having a pair of pivotable push-out pieces.

5. A disc unit according to claim 1, further comprising:
    lift members slidably disposed along side plates of the main housing;
    a connecting member disposed on a bottom of the main housing, having an upper surface, and connected with the lift members;
    a rotatable cam provided on the upper surface of the connecting member; and
    a motor to rotate the rotatable cam such that the connecting member is pivotably moved,
    the ceiling board moved vertically by the lift members, connecting member, rotatable cam and motor.

6. A disc unit according to claim 1, further comprising:
    lift members slidably disposed along side plates of the main housing;
    a connecting member disposed on a bottom of the main housing, having an upper surface, and connected with the lift members;
    a rotatable cam provided on the upper surface of the connecting member; and
    a motor to rotate the rotatable cam such that the connecting member is pivotably moved,
    the clamp chassis moved vertically by the lift members, connecting member, rotatable cam and motor.

7. A disc unit according to claim 1, the slide member further comprising:
    a pair of rotary arms spaced apart by a predetermined distance, each rotary arm rotatably supported around one end;
    a support arm oscillatably supported at another end of the pair of rotary arms, the support arm rotatably supporting the plurality of support pulleys;
    a link mechanism to connect said pair of rotary arms and to rotate the pair of rotary arms toward each other and away from each other; and
    a biasing member to bias the link mechanism and cause the rotary arms to move toward each other.

8. A disc unit according to claim 1, further comprising a pair of biasing members to bias the moving table upwardly, the moving table being biased downwardly by the clamper chassis, the clamper chassis vertically movable within the ejection area.

* * * * *